R. A. FESSENDEN.
METHOD AND APPARATUS FOR INSPECTING MATERIALS.
APPLICATION FILED AUG. 8, 1919.

1,414,077.

Patented Apr. 25, 1922.

WITNESS:

INVENTOR.

UNITED STATES PATENT OFFICE.

REGINALD A. FESSENDEN, OF NEWTON, MASSACHUSETTS.

METHOD AND APPARATUS FOR INSPECTING MATERIAL.

1,414,077.   Specification of Letters Patent.   Patented Apr. 25, 1922.

Application filed August 8, 1919. Serial No. 316,257.

*To all whom it may concern:*

Be it known that I, REGINALD A. FESSENDEN, of Chestnut Hill, Newton, in the county of Middlesex and State of Massachusetts, a citizen of the United States, have invented new and useful Improvements in Methods and Apparatus for Inspecting Materials, of which the following is a specification.

My invention relates to the inspection of material, to determine its state, accuracy of dimensions, and other properties.

It has for its object increased efficiency and accuracy in the making of such determinations.

Figure 1:
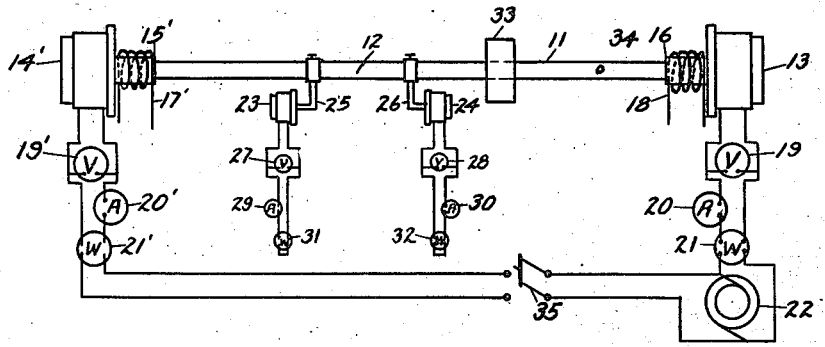
Figure 2:
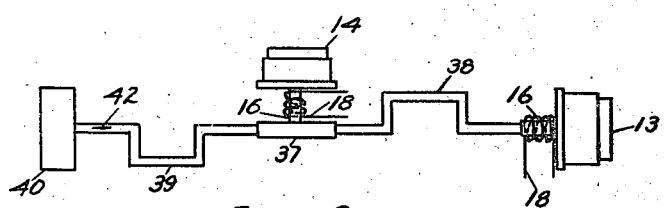
Figure 3:
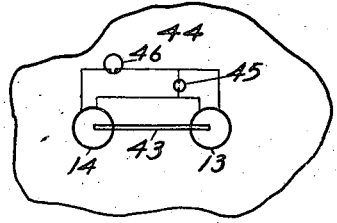

Figures 1, 2 and 3, show means adapted for carrying out my invention, Fig. 1 as applied to rods, Fig. 2 as applied to crankshafts, and Fig. 3 to surfaces.

Heretofore in the art of inspection it has been difficult to determine the existence of flaws or cavities in solids, or the variation in composition in fluid streams.

The methods heretofore used are X-rays, chemical analysis, tapping, measurements of density, determination of elasticity, and gauges.

Applicant's method consists in setting up elastic waves, either compressional or distortional, in the body to be inspected, and measuring the difference in phase of said waves at different points of said body, and determining thereby the degree of purity or uniformity of composition or accuracy of construction of said body.

Figure 1 shows the method applied to a long steel bar 11. A source of elastic waves, 13, preferably an oscillator with vibrating plunger 16, is attached to one end of the rod 11 by any suitable means, for example, by magnetic attraction by means of the magnetizing coil 18. The oscillator 13 is set in vibration by means of the dynamo 22, and at any desired frequency, but preferably the resonant frequency of the rod, readings are taken on the voltmeter 19, ammeter 20, and wattmeter 21. If these readings are the same as those taken on a similar rod which is known to be free from flaws and blow holes, then the conclusion may be drawn that the rod under test is also free from flaws and blow holes, for if a lateral flaw existed as shown at the point 12, that portion of the rod to the left of 12 would be acted upon by a smaller restoring force, since the virtual cross section of the rod has been diminished by the flaw 12, consequently the resonant frequency will be altered, and as a rule two frequencies will be generated in place of one, and if the instruments 19, 20, and 21, be photographically recording instruments, such for example as shown and described in applicant's U. S. Patents Nos. 1,341,795, dated June 1, 1920 and 1,045,782, dated November 26, 1912, the presence of these frequencies will be indicated.

Preferably, a second oscillator 14′, with its plunger 15′, magnetizing coil 17′, voltmeter 19′, ammeter 20′, and wattmeter 21′, may be placed at the other end of the rod, and may act as a generator driven by the oscillator 13, or may itself act as a motor by throwing the switch 35, and connecting it to the dynamo 22.

If both oscillators, 13 and 14′ be driven at the same time, and in the same phase, a node may be produced in the center of the rod, and this is an efficient means of determining defects near one end, such as the blow hole 34.

Or, instead of setting the rod in vibration by the oscillator 13, and loading it by means of the oscillator 14′, driven as a generator, the mass 33 may be attached at any convenient point along the rod, and this method also is very efficient in determining the presence of defects such as the blow hole 34 near one end of the rod.

Still another modification of my invention is to apply the oscillators 23, 24, by means of attaching clamps 25, 26, to the rod at a definite distance apart, as shown, and to excite the oscillator 13, and to determine the phase difference between the currents generated in the oscillators 23, 24 in any of the ways well known in the art, for example by connecting the oscillators 23, 24 to the instrument listed in the General Electric Company's catalogue for determining the phase difference between alternators when synchronizing them, or by the readings of the instruments 27, 28, 29, 30, 31, 32, these instruments being similar to the instruments 19, 20, 21 described above, and the photographic records being made of course simultaneously in the manner well known in the art and described for example in Berg's "Electrical Energy", page 177, par. 2.

If the rod is uniform in composition, and has no flaws, then on sliding the two oscillators 23, 24 along the rod, this phase difference will remain constant, but if a flaw is included between the two oscillators 23, 24, the phase difference will change.

If only a single reading is taken instead of sliding the oscillators 23, 24, along into different positions, or if merely the readings on the oscillator 13, or the oscillators 13' and 14' be taken, the state of the rod may be determined by comparing the readings so taken with those previously taken on a rod known to be without flaw, and to have stood up under its work satisfactorily.

Cases arise where flaws cannot be detected by simple longitudinal vibrations, such for example being the case where the flaw is a longitudinal flaw, and does not perceptibly change either the density or the longitudinal elasticity of the material.

In order to determine such flaws, torsional vibrations are made use of as shown in Figure 2, which illustrates the application of the method to determining the longitudinal flaws in a crankshaft.

Here 37, 38, 39 are cranks in the crankshaft, 14 is an oscillator, 16 its plunger, and 18 the magnetizing coil for the plunger.

On setting the oscillator 14 into vibration any longitudinal flaws in the crankshaft will be detected by the amount of oscillation at a given frequency, or its phase, or the frequency at which the shaft is set into resonant vibration, as before, the only difference being the vibrations are now torsional instead of longitudinal.

If flaws exist in the crankshaft, such as shown at 42, near one end of the crankshaft, they will be more difficult to detect, as the material beyond the flaw 42 does not greatly affect the frequency.

To detect such flaws therefore, masses such as 40 are attached to the end of the crankshaft as shown, and when this is done, the effect of the flaw will be made much more marked.

To determine the existence of transverse flaws in the crankshaft an oscillator 13, a plunger 16, and magnetizing coil 18, may be used as before.

Figure 3 shows the method applied to testing metal sheets such as boiler plate; or streams of fluid moving in channels with such velocity that their constituents do not diffuse into one another with sufficient rapidity to become homogeneous.

Here 13 and 14 are oscillators joined together by a rod of fixed length 43, and the plungers of the oscillators 13 and 14 rest on the surface of the sheet 44, if 44 is a sheet of metal, or are immersed in the fluid if 44 is a body of fluid; one of the oscillators, for example, 14, being set in vibration, the other 13 is driven as a generator and the difference in phase of the currents or voltages in the two oscillators may be measured by the instruments 45, 46. If now the two oscillators be moved about on the surface of the plate, or if the fluid be set in motion, if the phase difference remains the same the body is uniform, but if it varies, the body is non-uniform.

It will be obvious that this method of detecting flaws is not applicable to interdiffusing bodies, i. e., whose various parts diffuse into one another, as in that case the flaws or variations in composition will be masked or disappear.

What I claim as my invention is:

1. The method of inspecting localized conformations of material which consists in generating waves in said localized conformations and determining the phase difference of said waves between different points in said conformations.

2. The method of inspecting localized conformations of material which consists in setting said conformations into resonance by a source of sympathetic vibrations and in comparing the resonant frequency of said conformations with the resonant frequency of similar conformations known to be free from defects.

3. The method of inspecting localized conformations of material which consists in operatively connecting to a given part of said conformation a second body, generating elastic waves in said conformation, and determining the difference of phase between the various points in said conformation.

4. In the art of inspecting localized conformations of material, in combination, a source of elastic waves operatively connected to the material being inspected, and means for determining phase difference between different points in the material being inspected.

5. In the art of inspecting localized conformations of material, in combination, a source of elastic waves operatively connected to the material being inspected, a second body operatively connected to the material being inspected, and means for determining phase difference between different points in the material being inspected.

REGINALD A. FESSENDEN.